(12) United States Patent
Wood

(10) Patent No.: US 6,363,951 B1
(45) Date of Patent: Apr. 2, 2002

(54) OZONIZATION SYSTEM

(76) Inventor: Matthew R. Wood, 8073 W. Grand River Dr., Brighton, MI (US) 48114

( * ) Notice: Subject to any disclaimer, the term of this patent is extended or adjusted under 35 U.S.C. 154(b) by 0 days.

(21) Appl. No.: 09/433,144

(22) Filed: Nov. 3, 1999

Related U.S. Application Data

(60) Provisional application No. 60/107,065, filed on Nov. 4, 1998.

(51) Int. Cl.$^7$ ................................................. B08B 3/10
(52) U.S. Cl. ..................................... 134/102.2; 68/183
(58) Field of Search ........................... 134/102.1, 102.2; 68/183; 261/DIG. 42; 422/186.08, 186.12

(56) References Cited

U.S. PATENT DOCUMENTS

| | | |
|---|---|---|
| 1,865,433 A | 7/1932 | Daily |
| 3,448,045 A | 6/1969 | Hess et al. |
| 3,823,728 A | 7/1974 | Burris |
| 4,035,657 A | 7/1977 | Carlson |
| 4,176,061 A | 11/1979 | Stopka |
| 4,347,133 A | 8/1982 | Brigante |
| 4,352,740 A | 10/1982 | Grader et al. |
| 5,015,394 A | 5/1991 | McEllhenney et al. |
| 5,154,895 A | 10/1992 | Moon |
| 5,174,905 A | 12/1992 | Shaw |
| 5,184,633 A * | 2/1993 | Langford .............. 134/102.1 X |
| 5,207,237 A * | 5/1993 | Langford ................. 134/102.1 |
| 5,213,773 A | 5/1993 | Burris |
| 5,307,649 A * | 5/1994 | Lim et al. ................. 68/183 X |
| 5,336,413 A | 8/1994 | van Staveren |
| 5,376,265 A | 12/1994 | Szabo |
| 5,404,732 A * | 4/1995 | Kim ......................... 68/183 X |
| 5,411,713 A | 5/1995 | Iwanaga |
| 5,427,693 A | 6/1995 | Mausgrover et al. |
| 5,498,330 A | 3/1996 | Delle Cave |
| 5,501,844 A | 3/1996 | Kasting, Jr. et al. |
| 5,503,808 A | 4/1996 | Garbutt et al. |
| 5,520,887 A | 5/1996 | Shimizu et al. |
| 5,520,893 A | 5/1996 | Kasting, Jr. et al. |
| 5,524,358 A | 6/1996 | Matz |
| 5,540,848 A | 7/1996 | Engelhard |
| 5,540,898 A | 7/1996 | Davidson |
| 5,600,896 A | 2/1997 | Lin |
| 5,653,129 A * | 8/1997 | Jang ......................... 68/183 X |
| 5,683,576 A | 11/1997 | Olsen |
| 5,685,980 A | 11/1997 | Patapoff et al. |
| 5,960,649 A * | 10/1999 | Burdick .................... 68/183 X |

* cited by examiner

*Primary Examiner*—Philip R. Coe
(74) *Attorney, Agent, or Firm*—Mary M. Moyne; Ian C. McLeod

(57) ABSTRACT

An ozonization system (100, 200 or 300) for washing and cleaning objects (71) is described. The system includes a container (110, 210 or 310), an ozonization unit (50) and a diffuser assembly. The container can be a standard kitchen sink, a commercial sink, enclosure (30) or an airtight box (410). The ozonization unit contains a pump (8), an ozone generator (6) and a water separator (162, 262 or 362) which are all controlled by a control circuit (5). The diffuser assembly in one embodiment is a diffuser wand assembly which fits within the standard spray opening (110A) of a kitchen sink. The diffuser tip (129) is inserted into the container and the ozone is diffused into the container through the diffuser tip. In another embodiment, the container has a diffuser plate (214 or 314) spaced apart from the bottom. The ozone is inserted into the gap (213 or 313) between the diffuser plate and the bottom of the container. The ozone is diffused from the gap through the diffuser plate into the container.

19 Claims, 4 Drawing Sheets

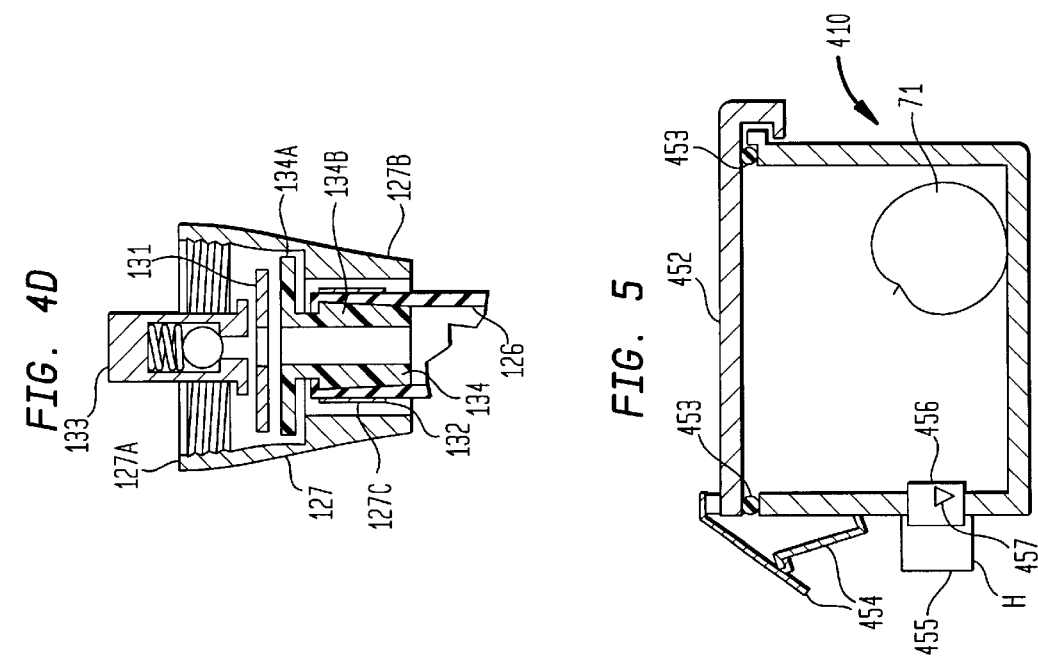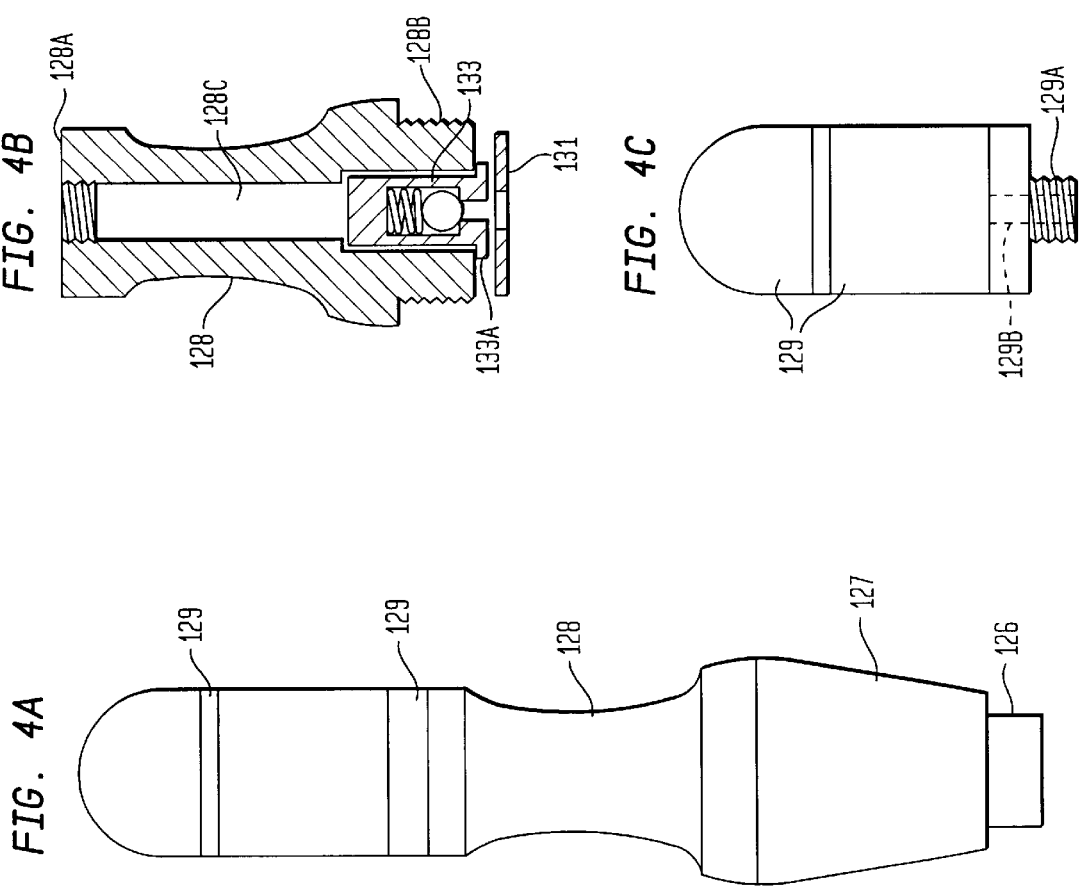

OZONIZATION SYSTEM

CROSS-REFERENCE TO RELATED APPLICATIONS

Figure 1:
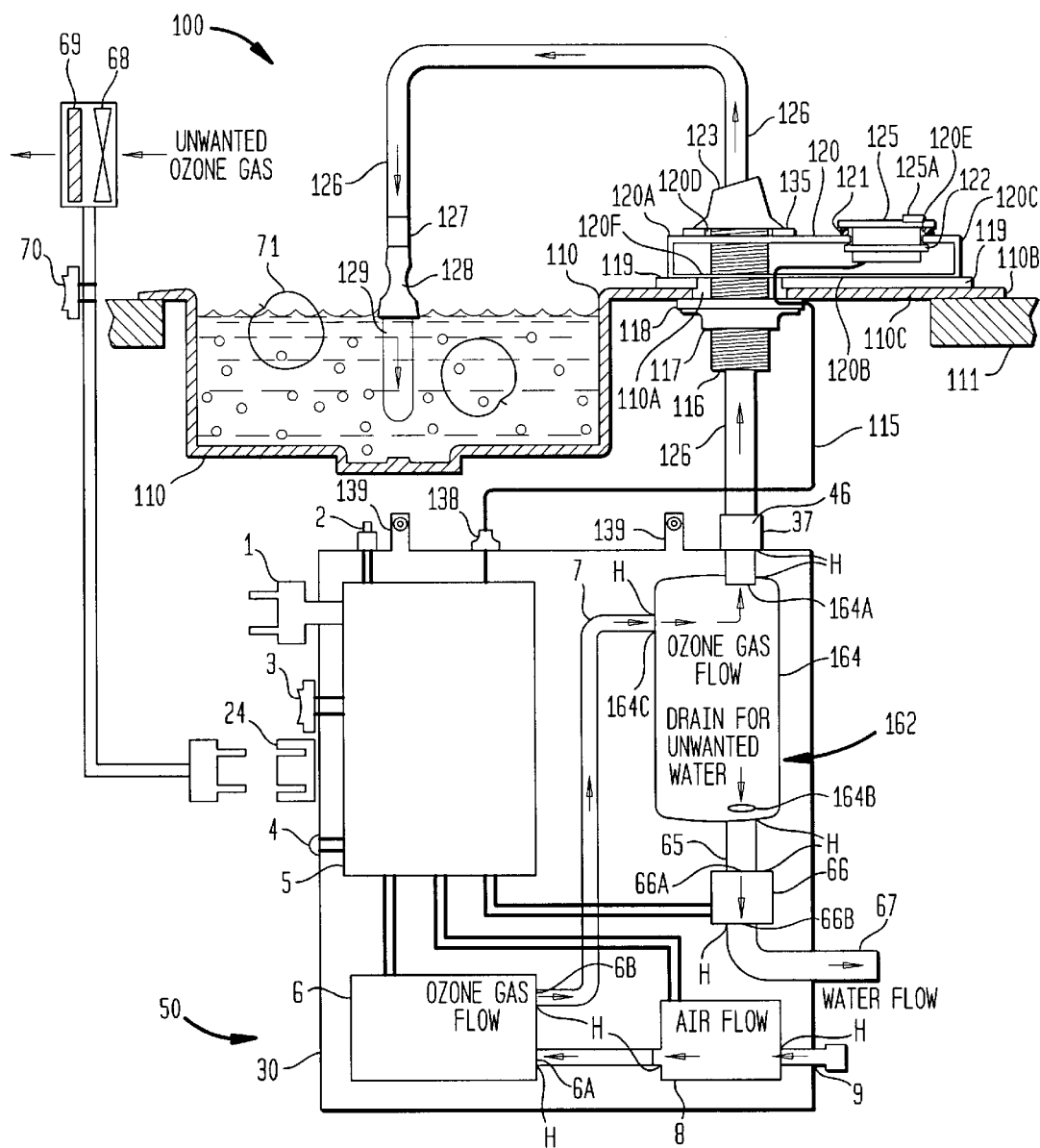

This application claims the benefit of U.S. Provisional Application Serial No. 60/107,065, filed Nov. 4, 1998.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION (1) Field of the Invention

The present invention relates to a system and method for washing objects using ozone. In particular, the present invention relates to a system and method for washing objects, such as food products, in a container having water by diffusing ozone into the water in the container.

(2) Description of the Related Art

The related art has shown various methods and systems using ozone to sterilize or clean, air, water and physical objects. Illustrative are U.S. Pat. No. 5,520,893 to Kasting, Jr. et al; U.S. Pat. No. 5,524,358 to Matz and U.S. Pat. Nos. 5,600,896 to Lin.

Kasting, Jr. et al shows an apparatus for sterilizing medical instruments using a water supply containing ozone sufficient for sterilization. The instruments are sterilized in a chamber having a lid. The apparatus is rendered inoperable if the lid of the chamber is open.

Matz describes a ventilation filtration kit for use with a residential dishwasher. The kit can include an ozonator which supplies ozone to the dishwasher during drying.

Lin describes an apparatus for drying and sterilizing kitchen utensils. The apparatus includes an electric heater and an ozone generator to dry and sterilize kitchen utensils. The kitchen utensils are mounted on a rack inside a cabinet. The air conduits for the ozone are connected together to form a manifold for guiding ozone from the ozone generator to the rack. The air conduits have a plurality of air outlets for distribution of hot ozone through the rack in all directions to heat dry and sterilize the kitchen utensils on the rack.

Also, of interest are U.S. Pat. No. 5,154,895 to Moon; U.S. Pat. No. 5,411,713 to Iwanaga; U.S. Pat. No. 5,427,693 to Mausgrover et al; U.S. Pat. No. 5,501,844 to Kasting, Jr. et al; U.S. Pat. No. 5,503,808 to Garbutt et al; U.S. Pat. No. 5,520,887 to Shimizu et al and U.S. Pat. No. 5,540,898 to Davidson which show various types of apparatuses for generating ozone.

Only of minimal interest are U.S. Pat. No. 1,865,433 to Daily; U.S. Pat. No. 3,448,045 to Hess et al; U.S. Pat. No. 3,823,728 to Burris; U.S. Pat. No. 4,035,657 to Carlson; U.S. Pat. No. 4,176,061 to Stopka; U.S. Pat. No. 4,347,133 to Brigante; U.S. Pat. No. 4,352,740 to Grader et al; U.S. Pat. No. 5,015,394 to McEllhenney et al; U.S. Pat. No. 5,174,905 to Shaw; U.S. Pat. No. 5,213,773 to Burris; U.S. Pat. No. 5,336,413 to van Staveren; U.S. Pat. No. 5,376,265 to Szabo; U.S. Pat. No. 5,498,330 to Delle Cave; U.S. Pat. No. 5,540,848 to Engelhard; U.S. Pat. No. 5,683,576 to Olsen and U.S. Pat. No. 5,685,980 to Patapoff et al which show various methods and apparatuses for purifying water using ozone.

There remains the need for a system and method for washing or cleaning objects, such as food, in water using ozone which can be integrated into a standard kitchen sink and which is economical to construct and use.

SUMMARY OF THE INVENTION

The method and system of the present invention uses ozone to clean or wash objects in water. The system includes a container for holding the water and the objects, an ozone generator for generating the ozone using the ambient air and a diffuser assembly for diffusing the ozone into the water in the container. The system can be used in a residential setting using a kitchen sink as the container. The ozonization unit is mounted in a cabinet beneath a sink. The diffuser assembly extends from the ozonization unit through an opening in the cabinet adjacent the sink. The diffuser assembly includes a diffuser tip connected to a flexible hose. The diffuser tip is placed in the water in the sink and the ozone is diffused into the water through the diffuser tip. The system and method allows for quick and easy cleaning of the objects in the sink using ozone. The system can also be used in a commercial setting. The container is an open topped enclosure tub and includes a diffuser plate spaced apart from the bottom of the enclosure tub. The ozone generator provides ozone to a gap between the bottom of the container and the diffuser plate. The ozone diffuses through the plate into the water in the container. The container can be provided with a rack or basket to hold the objects.

The present invention relates to a system for washing objects in a container having water using ozone, which comprises: an ozonization unit positioned adjacent to the container and having an air inlet and an ozone outlet with an ozone generator in fluid communication with the air inlet and the ozone outlet and including a control means for controlling the ozonization unit; and a diffuser assembly having an inlet in fluid communication with the ozone outlet of the ozonization unit and an outlet in fluid communication with the container wherein air, moving into the air inlet in the ozonization unit, is changed into ozone by the ozone generator and is moved out the ozone outlet of the ozonization unit into the inlet of the diffuser assembly and out the outlet of the diffuser assembly into the water in the container to wash the objects.

Further, the present invention relates to a system for washing objects in a container having a fluid using ozone, which comprises: an ozonization unit positioned adjacent to the container and having an air inlet and an ozone outlet with an ozone generator in fluid communication with the air inlet and the ozone outlet and including a control means for controlling the ozonization unit; and a wand assembly having a hose having opposed ends with one end forming an inlet of the wand assembly and the other end connected to an inlet of a diffuser tip with the diffuser tip forming an outlet of the wand assembly wherein air, moving into the air inlet in the ozonization unit, is changed into ozone by the ozone generator and is moved out the ozone outlet of the ozonization unit into the inlet of the wand assembly and out the outlet of the wand assembly wherein the diffuser tip is positionable in the fluid in the container to inject ozone into the fluid to wash the objects.

Still further, the present invention relates to a system for washing objects in a container having a fluid using ozone, which comprises: an ozonization unit positioned adjacent to the container and having an air inlet and an ozone outlet with an ozone generator in fluid communication with the air inlet and the ozone outlet and including a control means for controlling the ozonization unit; and a diffuser plate mounted adjacent a bottom of the container and having diffuser openings wherein air, moving into the air inlet in the ozonization unit, is changed into ozone by the ozone generator and is moved out the ozone outlet of the ozonization unit into the inlet of the diffuser plate and out the diffuser openings into the fluid in the container to wash the objects.

Further still, the present invention relates to a method for washing objects in a container having a fluid using ozone, which comprises the steps of: positioning an ozonization unit with a wand assembly adjacent the container, the ozonization unit including an air inlet and an ozone outlet with an ozonization generator in fluid communication with the air inlet and the ozone outlet and having a control means and the wand assembly including a hose having opposed ends with one end in fluid communication with the ozone outlet of the ozonization unit and the other end connected to a diffuser tip with the diffuser tip movably mounted adjacent the container; filling the container with the fluid and placing the objects in the container; placing the diffuser tip in the fluid in the container; and activating the ozonization unit such that ambient air moves into the air inlet of the unit and into the ozone generator where oxygen in the ambient air is converted to ozone and the ozone is moved out of the ozonization unit through the ozone outlet through the hose of the wand assembly and out the diffuser tip into the fluid in the container wherein the ozone in the fluid washes the objects in the container.

Finally, the present invention relates to a method for washing objects in a container having a fluid using ozone, which comprises the steps of: positioning an ozonization unit adjacent the container, the ozonization unit including an air inlet and an ozone outlet with an ozonization generator in fluid communication with the air inlet and the ozone outlet and having a control means; positioning a diffuser plate adjacent a bottom of the container wherein the diffuser plate has an inlet which is in fluid communication with the ozone outlet of the ozonization unit and an outlet which is in fluid communication with the fluid in the container; filling the container with the fluid and placing the objects in the container; and activating the ozonization unit such that ambient air moves into the air inlet of the unit and into the ozone generator where oxygen in the ambient air is converted to ozone and the ozone is moved out of the unit through the ozone outlet through the inlet of the diffuser plate and out the outlet of the diffuser plate into the fluid in the container wherein the ozone in the fluid washes the objects in the container.

The substance and advantages of the present invention will become increasingly apparent by reference to the following drawings and the description.

BRIEF DESCRIPTION OF THE DRAWING(S)

FIG. 1 is a schematic view of the system 100 of the first embodiment showing the ozonization unit 50 below the sink 110 and the diffuser wand assembly extending through the spray opening 110A of the sink 110.

Figure 2:
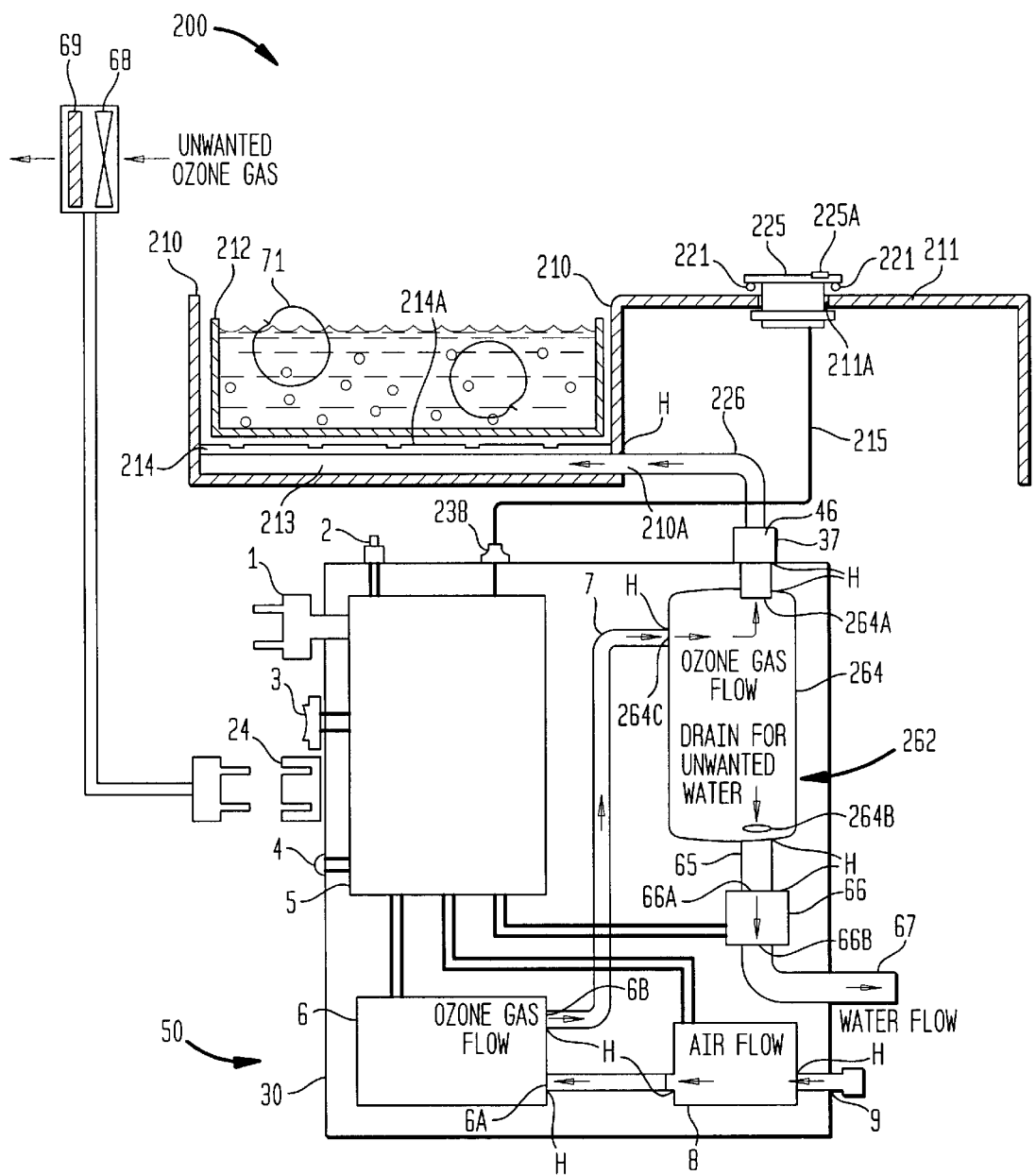

FIG. 2 is a schematic view of the system 200 of the second embodiment showing the diffuser plate 214 adjacent the bottom of the enclosure tub 210.

Figure 3:
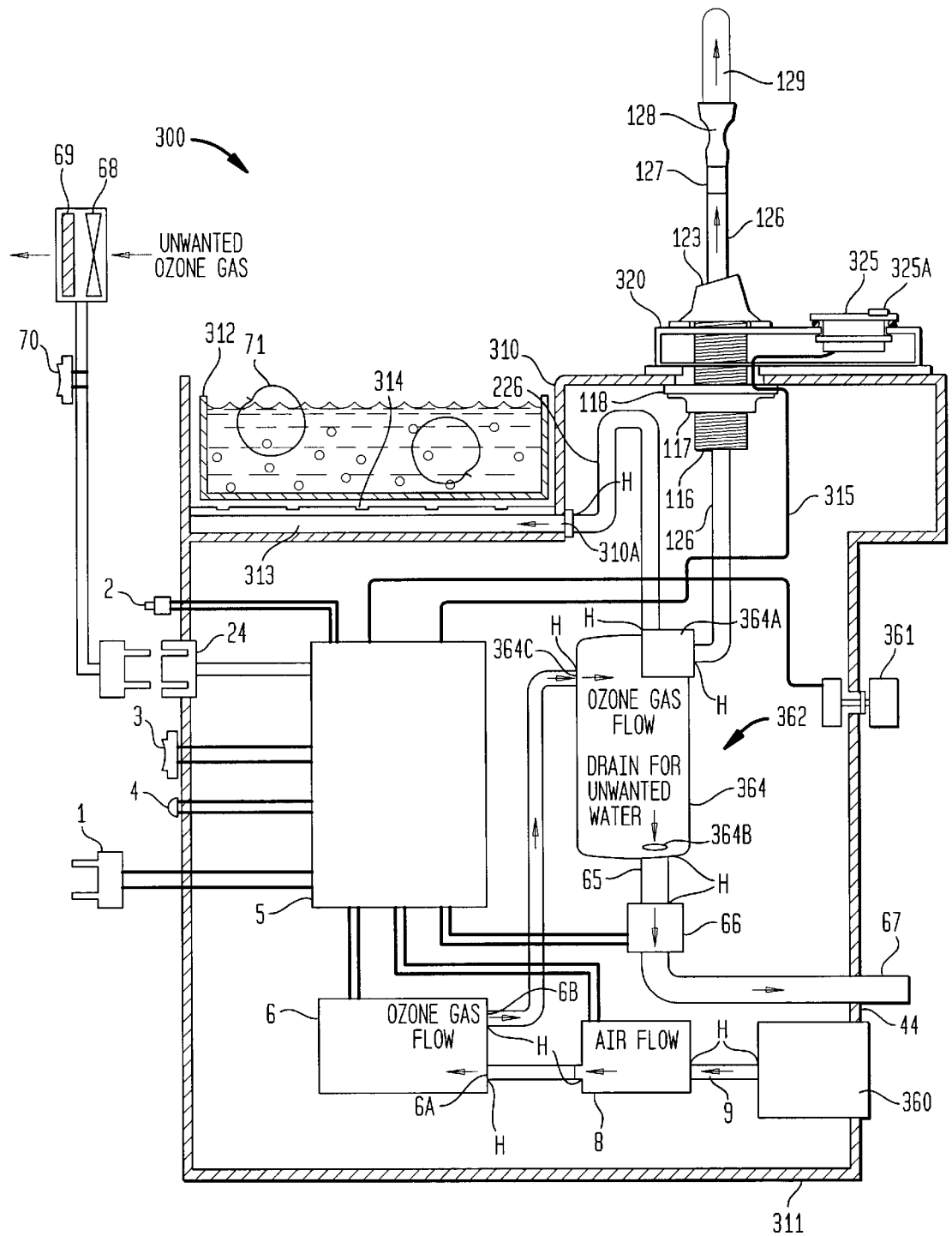

FIG. 3 is a schematic view of the system 300 of the third embodiment showing the diffuser plate assembly 314 and the diffuser wand assembly.

FIGS. 4A to 4D show the diffuser tip 129 and the wand grip 128 with the check valve 133 of the diffuser wand assembly.

FIG. 5 is a cross-sectional view of the box 410 of the fourth embodiment.

DESCRIPTION OF THE PREFERRED EMBODIMENT(S)

FIGS. 1 to 3 show the ozonization washing systems 100, 200 and 300 of the present invention. The systems 100, 200 and 300 include a container 110, 210 or 310, an ozonization unit 50 and a diffuser assembly. It is understood that the container 110, 210 or 310 used with any of the systems 100, 200 or 300 of the present invention can be of any form which can hold a fluid and an object 71 and which allows for diffusing the ozone into the fluid. In the first embodiment, the system 100 is intended for residential use. The container is preferably a standard kitchen sink 110 (FIG. 1) mounted in a cabinet 111. In the second and third embodiments, the ozonization washing system 200 or 300 is for commercial use. The container is a sink or enclosure tub 210 or 310 which is specifically designed to be used to wash food using ozone. The enclosure tub 210 or 310 is preferably an integral part of the cabinet 211 or 311 having the ozonization unit 50. The enclosure tub 210 or 310 is preferably of a size to hold a standard, commercial dishwasher rack (not shown) to allow for the washing and decontamination of dishes. Alternatively, the enclosure tub 210 or 310 can be provided with a wire basket 212 or 312 which fits within the enclosure tub 210 or 310 to allow for the washing and decontamination of objects 71 of various types and sizes. The rack or basket 212 or 312 is preferably constructed of an ozone resistant material such as stainless steel. The rack or basket 212 or 312 does not extend completely to the bottom of the enclosure tub 210 or 310 such that a gap 213 or 313 is provided between the bottom of the enclosure tub 210 or 310 and the bottom of the rack or basket 212 or 312.

In the fourth embodiment, the system 100 or 300 of the first or third embodiment is used with the airtight box 410 (FIG. 5) as the container. The box 410 holds the objects 71 in air as the fluid. In this embodiment, the box 410 includes a lid 452 which is able to be locked in a closed, sealed position by a locking hasp 454. The rim of the opening of the box 410 is provided with a sealing gasket 453 to allow for an airtight seal when the lid 452 of the box 410 is closed. One of the sides of the box 410 is provided with an inlet 457 to allow the ozone to be introduced into the interior of the box 410. The inlet 457 has a hose connector 455 which allows the hose 126 for the diffuser wand assembly of the first or third embodiments to be used in combination with the box 410 of the fourth embodiment. The inlet 457 of the box 410 has a valve 456 which prevents the ozone from escaping from the box 410 once the ozone has been introduced into the box 410.

The ozonization unit 50 is preferably similar for all embodiments. In the first and second embodiments, all of the components of the ozonization unit 50 are preferably mounted in an enclosure 30 (FIGS. 1 to 2). In the first embodiment, the enclosure 30 is preferably provided with mounting tabs 139 adjacent the upper end which enable the unit 50 to be mounted in the cabinet 111 having the sink 110. The enclosure 30 protects the components from harm by humans and water and provides easy mounting of the unit 50 adjacent the container 110 or 210. In the third embodiment, the components of the ozonization unit 50 are mounted separately in the cabinet 311 containing the enclosure tub 310 (FIG. 3). The ozonization unit 50 includes a control circuit 5, an air pump 8, an ozone generator 6 and a water separator 162, 262 or 362. The control circuit 5 controls the components of the ozonization unit 50. The control circuit 5 preferably includes a power cord 1, a main power switch 3, a power light 4, a tone generator (not shown), an IC timer (not shown) and a circuit breaker 2. The power cord 1 extends to the outside of the enclosure 30 or cabinet 311 and plugs into a standard 110V outlet. The use of a standard power cord 1 eliminates the need for special wiring and allows the system 100, 200 or 300 to be easily installed and removed. The main power switch 3 allows for completely turning "off" the system 100, 200 or 300 when desired. In the preferred embodiment, the main power switch 3 remains in the "on" position at all times during standard operation. The power light 4 extends to the outside of the enclosure 30 or cabinet 311 and indicates when the unit 50 is activated. The tone generator also indicates when the system 100, 200 or 300 is activated. Preferably, the tone sounds each time the activation switch 125 or 325 is touched. The IC timer automatically deactivates the system 100, 200 or 300 after a predetermined amount of time. The IC timer is preferably adjusted by a timer adjustment knob 361 which is connected to the control circuit 5 (FIG. 3). The adjustment knob 361 is preferably mounted on the outside of the enclosure 30 or cabinet 311. In the preferred embodiment, the control circuit 5 is provided with a power outlet 24 which allows for connection of a fan 68. The fan 68 is preferably positioned adjacent the container 110, 210 or 310 and is provided with a carbon filter 69 which destroys any ozone which escapes the container 110, 210 or 310 into the air (FIGS. 1 to 3). By connecting the fan 68 to the control circuit 5, the fan 68 is turned "on" and "off" when the ozonization unit 50 is turned "on" and "off". In the preferred embodiment, the fan 68 is also provided with a power switch 70 which allows the fan 68 to be turned "off" when the system 100, 200 or 300 is "on". In the first and second embodiments, a connector plug 138 and 238 is preferably a four (4) pin wire connector plug which allows for connection of the wire harness 115 or 215 of the activation switch 125 or 225 which activates the system 100 or 200 of the first and second embodiments. In the third embodiment, the switch 325 is directly wired to the control circuit 5.

The air pump 8 of the ozonization unit 50 moves ambient air into the ozonization unit 50 from outside of the enclosure 30 or cabinet 311. In the first and second embodiments, the inlet of the air pump 8 is connected to a flexible hose 9 which extends through an opening in the enclosure 30. The flexible hose 9 allows for air to be drawn into the pump 8 from outside the enclosure 30. In the third embodiment, the inlet of the air pump 8 is connected by the flexible hose 9 to the outlet of an air dryer 360 (FIG. 3). The inlet of the air dryer 360 is positioned on the outside of the cabinet 311 such that the pump 8 draws air from outside the cabinet 311 through the air dryer 360. In all embodiments, the air pump 8 is preferably a minimum 6 psi diaphragm pump similar to one manufactured by Apollo Pump, Inc.

The ozone generator 6 is provided with an inlet 6A for receiving atmospheric air from the air pump 8 and an outlet 6B for providing ozone to the container 110, 210 or 310 through the diffuser assembly. The ozone generator 6 converts the oxygen in the atmospheric air into ozone. In the preferred embodiment, the ozone generator 6 uses electricity to convert oxygen in atmospheric air into ozone. The ozone generator 6 is preferably able to produce a minimum of 0.5 grams of ozone per hour.

The water separator 162, 262 or 362 of the ozonization unit 50 includes a tank 164, 264 or 364 positioned vertically in the unit 50 and a solenoid valve 66. The tank 164, 264 or 364 has a top ozone outlet 164A, 264A or 364A, a bottom water outlet 164B, 264B or 364B and a side ozone inlet 164C, 264C or 364C. The outlet 6B of the ozone generator 6 is connected by a flexible hose 7 to the side inlet 164C, 264C or 364C of the tank 164, 264 or 364. The bottom outlet 164B, 264B or 364B of the tank 164, 264 or 364 is connected by a hose 65 to an inlet 66A of the solenoid valve 66. The outlet 66B of the solenoid valve 66 is connected by a hose 67 to an opening in the enclosure 30 or cabinet 311. The solenoid valve 66 is controlled by the control circuit 5. The solenoid valve 66 can be replaced by a standard check valve which is not electrically powered. In the first and second embodiments, the top outlet 164A or 264A of the tank 164 or 264 of the water separator 162 or 262 is connected by a hose to an opening in the top of the enclosure 30 adjacent the sink 110 or enclosure tub 210. A quick connect hose fitting 37 is preferably mounted on the end of the hose adjacent the opening. A check valve 46 is preferably positioned in the hose fitting 37. Alternatively, the check valve 46 can be positioned in the top outlet 164A or 264A of the tank 164 or 264 or in the hose extending from the top outlet 164A or 264A of the tank 164 or 264. The check valve 46 adjacent the top outlet 164A or 264A of the tank 164 or 264 prevents water from entering the tank 164 or 264. The hose fitting 37 is preferably a quick disconnect type to allow for easy disconnect of the ozonization unit 50 from the diffuser assembly. In the third embodiment, the diffuser wand assembly and the diffuser plate assembly are connected to a single ozone outlet 364A at the top of the tank 364 of the water separator 362. A check valve (not shown) similar to the check valve 46 of the first and second embodiments is preferably provided in the outlet 364A. In this embodiment, the hoses 126 and 226 for the diffuser assemblies preferably extend from the outlet 364A of the water separator 362 to the diffuser tip 129 or the inlet 310A of the enclosure tub 310.

In the first embodiment, a diffuser wand assembly is used to supply ozone from the ozonization unit 50 to the sink 110. The diffuser wand assembly includes a hose 126, a wand grip 128 and a diffuser tip 129 (FIGS. 1 and 4A to 4D). The hose 126 extends upward from the hose fitting 37 attached adjacent the top outlet 164A of the tank 164 of the water separator 162 and is connected at the other end by a hose connector 127 to the wand grip 128 and diffuser tip 129 (FIG. 1). The hose connector 127 preferably securely mounts on the end of the hose 126 by any well known means. In the preferred embodiment, a plastic, flanged hose-barb 134 is provided in the end of the hose 126 such that the flange 134A of the hose-barb 134 is adjacent the end of the hose 126 and the bottom portion 134B of the hose-barb 134 extends into the end of the hose 126 (FIG. 4D). A hose clamp 132 is provided on the outside of the hose 126 directly over the bottom portion 134B of the hose-barb 134. The hose clamp 132 is compressed to permanently lock the hose-barb 134 in the end of the hose 126. The hose connector 127 is then mounted on the end of the hose 126. The hose connector 127 has an open top end 127A and an open bottom end 127B with a center bore 127C extending therebetween. The center bore 127C at the open top end 127A is preferably provided with threads to allow for securing the wand grip 128 to the hose 126. To mount the connector 127 on the hose 126, the end of the hose 126 opposite the hose clamp 132 is slipped through the open, top end 127A of the hose connector 127. The hose 126 is pulled through the connector 127 until the flange 134A of the hose-barb 134 encounters a shoulder in the inner bore 127C of the connector 127 (FIG. 4D). To mount the wand grip 128 on the hose connector 127 and the hose 126, a washer gasket 131 is positioned on the upper surface of the flange 134A of the hose-barb 134 in the hose connector 127. The wand grip 128 is then attached to the top end 127A of the hose connector 127.

The wand grip 128 has opposed ends 128A and 128B with a center bore 128C extending therebetween. The bottom end 128B of the wand grip 128 is mounted in the open, top end 127A of the hose connector 127. The outer surface of the bottom end 128A of the wand grip 128 is provided with threads which mate with threads in the top end 127A of the hose connector 127. The center bore 128C of the wand grip 128 adjacent the bottom end 128B has an enlarged section which is provided with a check valve 133. In the preferred embodiment, the valve 133 has a flanged end 133A. The valve 133 is press fit into the center bore 128C of the wand grip 128 at the bottom end 128B such that the flanged end 133A of the check valve 133 is seated against the bottom end 128B of the wand grip 128 (FIG. 4B). The check valve 133 allows ozone to pass through the wand grip 128 to the diffuser tip 129 and prevents water from moving from the diffuser tip 129 through the hose 126 and into the ozonization unit 50. The check valve 133 is preferably similar to standard check valves well known in the art. The outside surface of the wand grip 128 has a curved middle section which allows for comfortable and easy gripping of the wand assembly by the user. In the preferred embodiment, the wand grip 128 is provided with a weight to allow the diffuser assembly to sink to the bottom of the sink 110. Alternatively, the wand grip 128 can be constructed of a heavy material. The center bore 128C adjacent the top end 128A of the wand grip 128 is preferably threaded to allow for securing the diffuser tip 129 to the wand grip 128.

The diffuser tip 129 is provided with a threaded extension 129A which mates with the threaded center bore 128C at the top end 128A of the wand grip 128 to secure the diffuser tip 129 to the wand grip 128. The extension 129A has a center bore 129B which allows the ozone to move from the wand grip 128 into the diffuser tip 129. The diffuser tip 129 is preferably constructed of an ozone resistant, porous material such as plastic materials, for example, VITON™ or KYNAR™ or other materials such as those containing PVDF. The diffuser tip 129, except for the extension 129A, preferably has openings (not shown) which allow the ozone to be diffused into the water in the container 110 or 210. The diffuser tip 129 preferably has a length of about 1.75 inches (4.45 cm) without the extension 129A and with a general diameter of about 0.5 inches (1.3 cm). The end of the diffuser tip 129 opposite the extension 129A is preferably rounded to prevent damage to the enclosure tub 110 or 210 and the objects 71 during use (FIG. 4C).

The diffuser wand assembly of the first embodiment is preferably mounted in the standard spray opening 110A of a standard sink cabinet 111 adjacent the sink 110 (FIG. 1). To hold the diffuser wand assembly in the spray opening 110A, a hose guide 116 having a center bore is positioned in the opening 110A. A guide housing 120 is mounted on the top surface 110B of the sink 110 over the hose guide 116. The guide housing 120 has an upper wall 120A and a lower wall 120B with sidewalls 120C extending therebetween. A gasket 119 is provided between the sink 110 and the lower wall 120B to provide a liquid seal between the sink 110 and the guide housing 120. The upper wall 120A of the guide housing 120 is provided with two (2) openings 120D and 120E. The lower wall 120B is provided with a single opening 120F which matches one of the openings 120D in the upper wall 120A. The hose guide 116 extends through the matching openings 120D and 120E in the upper and lower walls 120A and 120B of the guide housing 120 and through the opening 110A in the sink 110. The hose guide 116 preferably has an outer diameter slightly less than the diameter of the openings 120D and 120F such that the hose guide 116 easily slips through the openings 120D and 120F. The outer surface of the hose guide 116 preferably has threads. A slotted washer 118 and a locking nut 117 are secured on the hose guide 116 on the side adjacent the bottom surface 110C of the sink 110. The slot (not shown) in the washer 118 allows the wire harness 115 for the activation switch 125 to extend around the hose guide 116 and through the opening 110A in the sink 110. The slotted washer 118 protects the wires of the wire harness 115 from being crushed by the locking nut 117 when the nut 117 is tightened. A guide flange 123 is mounted over the top end of the hose guide 116 adjacent the upper wall 120A of the guide housing 120. The guide flange 123 and hose guide 116 can be a unitary piece. The guide flange 123 preferably has an outer diameter greater than the diameter of the opening 120D in the upper wall 120A of the guide housing 120 to prevent debris from entering the opening 120B around the outer surface of the hose guide 116. A hose guide gasket 135 is preferably positioned between the guide flange 123 and the upper wall 120A of the guide housing 120 to provide a liquid seal around the hose guide 116 at the opening 120D. The top portion of the guide flange 123 is preferably provided with a wand holder (not shown). The wand holder holds the diffuser wand assembly in position in the spray opening 110A in the sink 110. The positioning of the wand assembly in the guide flange 123 is similar to the positioning of a standard hose sprayer in the sprayer sink opening 110A of a standard sink 110.

Once the diffuser wand assembly is together, the end of the hose 126 opposite the hose connector 127 is slid through the hose guide 116 and the opening 110A in the sink 110 until the hose connector 127 is cradled in the guide flange 123. The positioning of the diffuser wand assembly in the guide flange 123 allows the diffuser wand assembly to be easily pulled out of the guide flange 123 by hand with little effort. The diffuser wand assembly is replaced in the guide flange 123 by sliding the hose 126 back through the hose guide 116 until the hose connector 127 is cradled back in the guide flange 123.

In the first embodiment, an activation switch 125 for the system 100 is mounted in the second opening 120E in the upper wall 120A of the guide housing 120. The activation switch 125 is connected to the control circuit 5 by a wire harness 115 which extends down through the opening 110A in the sink 110 to a connector plug 138 on the enclosure 30 for the ozonization unit 50. The connector plug 138 is preferably directly wired to the control circuit 5. The activation switch 125 is preferably a piezo touch switch which is turned "on" and "off" by depressing the top portion of the switch 125. The switch 125 is preferably provided with a light 125A to enable a user to know when the system 100 is active. An o-ring 121 is preferably provided between the top portion of the switch 125 and the upper wall 120A of the guide housing 120 such that the o-ring 121 provides a liquid seal around the switch 125 in the opening 120A. A locking jam nut 122 is mounted over the bottom portion of the switch 125 which extends below the upper wall 120A of the guide housing 120. The jam nut 122 acts to hold the switch 125 in place in the guide housing 120.

In the system 200 of the second embodiment, a diffuser plate assembly 214 is used to supply ozone from the ozonization unit 50 to the water in the enclosure tub 210. The diffuser plate assembly 214 includes a hose 226 and a diffuser plate 214. The hose 226 extends from the enclosure 30 to an inlet 210A adjacent the bottom of the enclosure tub 210. The porous diffuser plate 214 is positioned in the gap 213 between the bottom of the enclosure tub 210 and the bottom of the rack or basket 212. The diffuser plate 214 is provided with openings 214A. In the preferred embodiment, the openings 214A are of such a size as to allow the ozone to move through the plate 214 to the water in the enclosure tub 210 while preventing the water in the enclosure tub 210 from moving through the diffuser plate 214 into the gap 213. In one (1) embodiment, the diffuser plate 214 is constructed of an ozone resistant, porous material such as plastic materials, for example, VITON™ or KYNAR™ or other materials such as those containing PVDF. The activation switch 225 is mounted in an opening 211A in the cabinet 211 having the enclosure tub 210. The activation switch 225 is preferably similar to the activation switch 125 of the first embodiment and includes an activation light 225A. The activation switch 225 is mounted in the opening 211A of the cabinet 211 similarly to the mounting of the activation switch 125 of the first embodiment in the opening 120D of the guide housing 120 in the first embodiment. An o-ring 221 is provided between the switch 225 and the cabinet 211 to provide a seal around the opening 211A in the cabinet 211.

The third embodiment is a combination of the first embodiment and the second embodiment. The third embodiment has both a diffuser wand assembly and a diffuser plate assembly. The diffuser wand assembly and the diffuser plate assembly are preferably identical to those of the first and second embodiments. The hose 126 for the wand assembly and the hose 226 for the diffuser plate assembly are connected to a single combined outlet 364A at the top of the tank 364 of the water separator 362 (FIG. 3). The system 300 preferably has a single activation switch 325 which activates both the diffuser wand assembly and the diffuser plate assembly. The activation switch 325 is preferably similar to the activation switch 125 or 225 of the first and second embodiments. The activation switch 325 is preferably mounted in a guide housing 320 similarly to the first embodiment. In all of the embodiments, the hoses are preferably connected to the various components of the system 100, 200 or 300.using hose connectors 127. The hoses are preferably connected to the various components of the ozonization unit 50 by hose connectors H. The hoses connecting the components of the ozonization unit 50 including the hoses 126 and 226 of the diffuser assemblies preferably have a 0.25 inch (0.64 cm) diameter and are constructed of an ozone resistant flexible hose or tube.

IN USE

In all embodiments, the ozonization unit 50 is preferably constructed as a unit prior to assembly of the remainder of the system 100, 200 or 300. In the first and second embodiments, once the ozonization unit 50 is mounted in the cabinet 111 or 211, the hose 126 or 226 for the diffuser wand assembly or the diffuser plate assembly is connected to the hose fitting 37 on the enclosure 30 connected to the top outlet 164A or 264A of the water separator 162 or 262. In the third embodiment, the hoses 126 and 226 for the diffuser wand assembly and the diffuser plate assembly are connected directly to the outlet 364A at the top of the tank 364 of the water separator 362. Next, the wire harness 115 or 215 for the activation switch 125 or 225 for the first and second embodiments is connected to the connector plug 138 or 238 on the top of the enclosure 30 of the unit 50. In the third embodiment, the wire harness 315 of the activation switch 325 is directly connected to the control circuit 5. In the preferred embodiment, the timer adjust knob 361 is also connected to the control circuit 5. The timer adjust knob 361 is preferably directly wired to the control circuit 5. In the preferred embodiment, when a fan F is used, the fan 68 is also plugged into the ozonization unit 50 and turned "on" prior to turning the system 100, 200 or 300 "on". Preferably, the fan 68 only has power when the system 100, 200 or 300 is "on". In the preferred embodiment, the fan 68 is activated when the system 100, 200 or 300 is activated. The fan 68 is only needed where excessive ozone may become a problem. The carbon filter 69 adjacent the fan 68 is preferably constructed of carbon which destroys the ozone. This eliminates the need to vent the fan 68 to the outdoors.

In the first, second and third embodiments to begin the cleaning or washing process, the container 110, 210 or 310 is first filled with water. Next, the objects 71 are placed in the water. In the second and third embodiments, if a rack or wire basket 212 or 312 is used, the objects 71 are placed in the rack or wire basket 212 or 312 and the rack or basket 212 or 312 is moved into the water in the enclosure tub 210 or 310. In the fourth embodiment, using the impregnation box 410, the objects 71 are placed in the box 410 and the lid 452 on the box 410 is closed and sealed. The box 410 can be filled with water but preferably the box 410 is filled with air.

In the first embodiment, once the sink 110 is full of water and the objects 71 are in the sink 110, the diffuser wand assembly is removed from the hose guide 116 and inserted into the water in the sink 110. Preferably, the weight of the wand assembly and particularly, the wand grip 128, causes the diffuser tip 129 to move to the bottom of the sink 110. This allows for hands free operation. The diffuser wand assembly is preferably of a length such that the diffuser tip 129 can rest on the bottom of the sink 110. Once the diffuser tip 129 is fully submerged, the activation switch 125 is touched to activate the system 100. When the system 100 is activated, the ozone moves from ozonization unit 50 through the hose 126 into the diffuser tip 129 and through the openings in the diffuser tip 129 into the water in the sink 110 to surround the objects 71 and thus, clean the objects 71.

In the second embodiment, the system 200 is activated as soon as the enclosure tub 210 is filled with water and the objects 71 are placed in the enclosure tub 210. The ozone is moved from the ozonization unit 50 through the hose 226 to the gap 213 adjacent the bottom of the enclosure tub 210. The force of the ozone preferably moves the ozone through the porous openings 214A in the diffuser plate 214 and into the water in the enclosure tub 210. The holes in the rack or basket 212 holding the objects 71 allow ozone to move from the gap 213 through the diffuser plate 214 and into the rack or basket 212 to surround the objects 71 and thus, clean the objects 71.

The system 300 of the third embodiment is a combination of the first and second embodiments. The system 300 is activated by touching a single activation switch 325. The diffuser assemblies diffuse ozone to the fluid in the enclosure tub 310 similarly to the diffuser assemblies of the first and second embodiments. The systems 100 or 300 of the first or third embodiments are preferably able to be used with an impregnation box 410 of the fourth embodiment. In this embodiment, the system 100 or 300 is activated once the box 410 is sealed shut and the hose 126 of the diffuser wand assembly is connected to the inlet 457 of the box 410. Preferably, the diffuser tip 129 of the diffuser wand assembly is removed from the wand grip 128 so that the hose 126 of the diffuser wand assembly can be connected to the inlet 457 of the box 410. When the system 100 or 300 is activated, the ozone moves from the ozonization unit 50 through the hose 126 and into the interior of the box 410. Once the box 410 is full of ozone and air, the hose 126 is removed. The check valve 456 in the inlet 457 prevents the ozone and air from escaping from the box 410. After the hose 126 is removed from the inlet 457, the ozone will remain in the box 410 and the contents with the box 410 may be stored or refrigerated. Due to the pressure of the fluid in the box 410, the ozone is forced to penetrate the porous objects 71 in the box 410 thus, cleaning the inside of the objects 71 as well as the outside of the objects 71. The impregnation box 410 works well with porous food products such as meats. In addition, when the object 71 has a moisture content, such as hamburger, which inhibits or blocks the penetration of the ozone, the pressure of the ozone and air inside the box 410 overcomes the surface tension of the water in the moisture and enables the ozone to penetrate the object 71.

The systems 100, 200 or 300 preferably operate similarly in all embodiments. When the systems 100, 200 or 300 are activated, the air pump 8 and the ozonization unit 50 are turned "on". The light 125A, 225A or 325A on the activation switch 125, 225 or 325 lights when the system 100, 200 or 300 has been activated. If the fan 68 and carbon filter 69 are also being used, preferably the fan 68 begins running at the same time the system 100, 200 or 300 is activated. In the preferred embodiment, the fan 68 is turned "on" and "off" automatically with the system 100, 200 or 300. The solenoid valve 66 at the bottom outlet 164B, 264B or 364B of the tank 164, 264 or 364 of the water separator 162, 262 or 362 is also moved into the closed position. When activated, the air pump 8 draws air from outside of the enclosure 30 or cabinet 211 or 311. In the third embodiment, the air is first drawn through an air dryer 360 located inside of the cabinet 311. The air is moved through the pump 8 to the inlet 6A of the ozone generator 6. In the ozone generator 6, the oxygen in the air is changed into ozone. The ozone is then moved out of the outlet 6B of the ozone generator 6 and into the side ozone inlet 164C, 264C or 364C of the tank 164, 264 or 364 of the water separator 162, 262 or 362. The ozone then moves out the top outlet 164A, 264A or 364A of the water separator 162, 262 or 362 and through the diffuser assembly or diffuser assemblies to the interior of the container 110, 210, 310 or 410. The ozone enters the fluid in the container 110, 210, 310 or 410 and surrounds the objects 71 and cleans or washes the objects 71. The pump 8 continues to move new air into the ozone generator 6 which causes the ozone to be moved out of the ozone generator 6 through the water separator 162, 262 or 362 to the diffuser assembly.

The water separator 362 prevents water which has entered the diffuser assembly from entering the electrical portion of the ozonization unit 50 and damaging the ozonization unit 50 while allowing the ozone to exit the unit 50. The check valve 133 in the wand grip 128 of the diffuser wand assembly in the first and third embodiments and the check valve 46 in the hose fitting 37 adjacent the top outlet 164A, 262A or 364A of the water separator 162, 262 or 362 in all embodiments, are all intended to prevent water from moving from the container 110, 210, 310 or 410 through the hose 126 or 226 and into the ozonization unit 50. When the system 100, 200 or 300 is deactivated, the solenoid valve 66 is open to allow water to drain from the diffuser assembly through the water separator 162, 262 or 362. The solenoid valve 66 closes when the system 100, 200 or 300 is activated to allow the ozone to be moved to the diffuser assembly through the water separator 162, 262 or 362. If water enters the ozonization unit 50, the water enters the top outlet 164A, 264A or 364A of the tank 164, 264 or 364 of the water separator 162, 262 or 362 and drops down to the bottom of the tank 164, 264 or 364 and accumulates adjacent the solenoid valve 66. When the system 100, 200 or 300 is deactivated, the solenoid valve 66 opens and the water is drained from the ozonization unit 50 through a drain hose 9 extending from the bottom outlet 164B, 264D or 364B of the tank 164, 264 or 364 to the outside of the enclosure 30. However, preferably, the force of the ozone moving through the hose 126 or 226 prevents water from entering the hose 126 or 226. The system 100, 200 or 300 preferably produces about 0.5 grams of ozone per hour. In general, for a container 110, 210 or 310 having 1 gallon of water, it takes a minimum of 3 to 5 minutes to ozonate the water and completely clean the objects 71 in the container 110, 210 or 310. However, variables such as water and air temperature can affect the time necessary to ozonate the water and clean the objects 71. The time needed to clean the objects 71 also depends on the substances which need to be removed from the objects 71. The ozonization unit 50 continues to produce ozone until the user touches the activation switch 125, 225 or 325 to turn the system 100, 200 or 300 "off" or until a predetermined time has elapsed and the timer in the control circuit 5 automatically deactivates the system 100, 200 or 300. The predetermined time can be adjusted by the user by turning the timer adjustment knob 361.

The system 100, 200 or 300 of the present invention has many uses. The ozone kills pathogens and destroys chemicals and oxidizes lead, iron and other heavy metals in the water enabling the system 100, 200 or 300 to be used to purify water or to make oxygen rich water without chemicals. The system 100, 200 or 300 can also be used as a food scrubber. The ozone destroys chemicals and sealing waxes often found on foods, particularly, fruits and vegetables. Further, the system 100, 200 or 300 can be used as a food preserver and protector. The ozone kills pathogens such as mold, fungi and mildew as well as insects, bacterial, protozoa, yeasts and viruses which triples shelf life. The system 100, 200 or 300 also tenderizes meats by dissolving fats and oxidizes oils. The system 100, 200 or 300 also kills pathogens in unpasteurized drink products which reduces souring and increases (triples) shelf life. The ozone from the system 100, 200 or 300 kills pathogens on utensils, baby bottles, stuffed toys, toothbrushes, dish rags and other items. By adding ozone to water for plants, plants grow faster, cut flowers last longer and less chemicals, fertilizers and watering are needed. The system 100, 200 or 300 will also purify the air by deodorizing cooking odors, and sanitizing and destroying smoke and other gases. Ozone also increases the wetting of the water thus, allowing soap to work more effectively. Finally, the system 100, 200 or 300 can be used as a hand sanitizer.

It is intended that the foregoing description be only illustrative of the present invention and that the present invention be limited only by the hereinafter appended claims.

I claim:

1. A system for washing objects in a container having water using ozone, which comprises:
   (a) an ozonization unit positioned adjacent to the container and having an air inlet and an ozone outlet with an ozone generator in fluid communication with the air inlet and the ozone outlet and including a control means for controlling the ozonization unit;
   (b) a diffuser assembly having an inlet in fluid communication with the ozone outlet of the ozonization unit and an outlet in fluid communication with the container wherein air, moving into the air inlet in the ozonization unit, is changed into ozone by the ozone generator and is moved out the ozone outlet of the ozonization unit into the inlet of the diffuser assembly and out the outlet of the diffuser assembly into the water in the container to wash the objects; and (c) a fan positioned adjacent the container to disperse excess ozone in air adjacent the system.

2. The system of claim 1 wherein the control means has an activation switch and the container is a sink mounted in a cabinet and wherein the activation switch is mounted in the cabinet adjacent the sink.

3. The system of claim 1 wherein a pump is provided adjacent the air inlet of the ozonization unit to move air into the air inlet and into the ozone generator.

4. The system of claim 1 wherein the fan is controlled by the control means such that the fan is activated when the ozonization unit is activated.

5. The system of claim 1 wherein a filter is provided adjacent the fan and the fan moves the excess ozone through the filter and wherein the filter destroys the ozone.

6. The system of claim 1 wherein the container is an airtight container having an inlet in fluid communication with the outlet of the diffuser assembly.

7. A system for washing objects in a container having a fluid using ozone, which comprises:

(a) an ozonization unit positioned adjacent to the container and having an air inlet and an ozone outlet with an ozone generator in fluid communication with the air inlet and the ozone outlet and including a control means for controlling the ozonization unit; and (b) a wand assembly having a hose having opposed ends with one end forming an inlet of the wand assembly and the other end connected to an inlet of a diffuser tip with the diffuser tip forming an outlet of the wand assembly wherein air, moving into the air inlet in the ozonization unit, is changed into ozone by the ozone generator and is moved out the ozone outlet of the ozonization unit into the inlet of the wand assembly and out the outlet of the wand assembly wherein the diffuser tip is positionable in the fluid in the container to inject ozone into the fluid to wash the objects.

8. The system of claim 7, wherein the container is a sink mounted in a cabinet and the ozonization unit is mounted in the cabinet and wherein the hose of the wand assembly extends through an opening in the cabinet such that the diffuser tip is positionable in the sink.

9. The system of claim 7 wherein the control means has an activation switch and the container is a sink mounted in a cabinet and wherein the activation switch is mounted in the cabinet adjacent the sink.

10. The system of claim 7 wherein a pump is provided adjacent the air inlet of the ozonization unit to move air into the air inlet and into the ozone generator.

11. The system of claim 7 wherein a diffuser plate is mounted adjacent a bottom of the container, the diffuser plate having diffuser openings in fluid communication with the fluid in the container wherein the diffuser plate injects ozone into the fluid in the container adjacent the bottom of the container to wash the objects.

12. The system of claim 7 wherein a fan is positioned adjacent the container to disperse excess ozone in air adjacent the system.

13. The system of claim 12 wherein the fan is controlled by the control means such that the fan is activated when the ozonization unit is activated.

14. The system of claim 12 wherein a filter is provided adjacent the fan and the fan moves the excess ozone through the filter and wherein the filter destroys the ozone.

15. The system of claim 7 wherein the container is an airtight container having an inlet in fluid communication with the outlet of the wand assembly.

16. The system of claim 7 wherein a check valve is located between the diffuser tip and the end of the hose to prevent the fluid in the container from entering the hose through the diffuser tip and entering the ozonization unit.

17. The system of claim 7 wherein the diffuser tip has a weight such that the diffuser tip will move to a bottom of the container.

18. A system for washing objects in a container having a fluid using ozone, which comprises:

(a) an ozonization unit positioned adjacent to the container and having an air inlet and an ozone outlet with an ozone generator in fluid communication with the air inlet and the ozone outlet and including a control means for controlling the ozonization unit;

(b) a diffuser plate formed into a bottom of the container and having diffuser openings wherein air, moving into the air inlet in the ozonization unit, is changed into ozone by the ozone generator and is moved out the ozone outlet of the ozonization unit into the inlet of the diffuser plate and out the diffuser openings into the fluid in the container to wash the objects; and (c) a basket positioned in the container spaced apart from the diffuser plate, wherein the objects are placed in the basket.

19. The system of claim 18 wherein the diffuser openings are of such a size as to allow the ozone to be moved into the fluid while preventing the fluid from moving into the diffuser plate.

* * * * *